United States Patent [19]
Brams

[11] Patent Number: 5,858,422
[45] Date of Patent: Jan. 12, 1999

[54] PRESSURE AND ALIGNMENT COMPENSATOR FOR A PRESS

[75] Inventor: Peter Brams, München, Germany

[73] Assignee: Krauss-Maffei AG, Munich, Germany

[21] Appl. No.: 786,095

[22] Filed: Jan. 17, 1997

[30] Foreign Application Priority Data

Mar. 12, 1996 [DE] Germany .................. 196 09 568.9

[51] Int. Cl.⁶ ...................................................... B29C 45/64
[52] U.S. Cl. ................... 425/595; 100/258 A; 425/451.9
[58] Field of Search ................. 425/589, 451.6, 425/593, 592, 451.5, 451.2, 590, 595; 100/272, 231, 258 A

[56] References Cited

U.S. PATENT DOCUMENTS

| | | | |
|---|---|---|---|
| 4,753,592 | 6/1988 | Kaaden | 425/547 |
| 5,314,327 | 5/1994 | Stein | 425/589 |
| 5,633,024 | 5/1997 | Ziv-Av | 425/589 |
| 5,674,541 | 10/1997 | Svoboda | 425/190 |

FOREIGN PATENT DOCUMENTS

| | | |
|---|---|---|
| 2 028 009 | 12/1971 | Germany . |
| 33 25 283 | 6/1985 | Germany . |
| 31 07 865 | 11/1985 | Germany . |
| 43 17 476 | 12/1994 | Germany . |
| 1322667 | 7/1973 | United Kingdom . |
| 2278310 | 11/1994 | United Kingdom . |

OTHER PUBLICATIONS

"Device for Clamping Mold for Injection Molding", (Abstract), 5–305414(A),M–1563 Feb. 21, 1994 vol. 18/No. 104, Toyoake Ueno, 1 page.

*Primary Examiner*—James P. Mackey
*Attorney, Agent, or Firm*—Herbert Dubno; Andrew Wilford

[57] ABSTRACT

A compensator is used with a machine frame having a pair of ends, a first mold half secured to one of the frame ends, a second mold half movable along an axis toward and away from the first mold half, and an actuator braced against the other frame end and having an outer end operatively engageable with the second mold half for pressing the second mold half axially against the first mold half. The compensator has an element secured on the second mold half and another element secured on the actuator outer end together forming a substantially closed chamber. The two elements are displaceable axially and tippable relative to each other. A multiplicity of relatively displaceable and substantially incompressible metal balls fills the chamber.

5 Claims, 7 Drawing Sheets

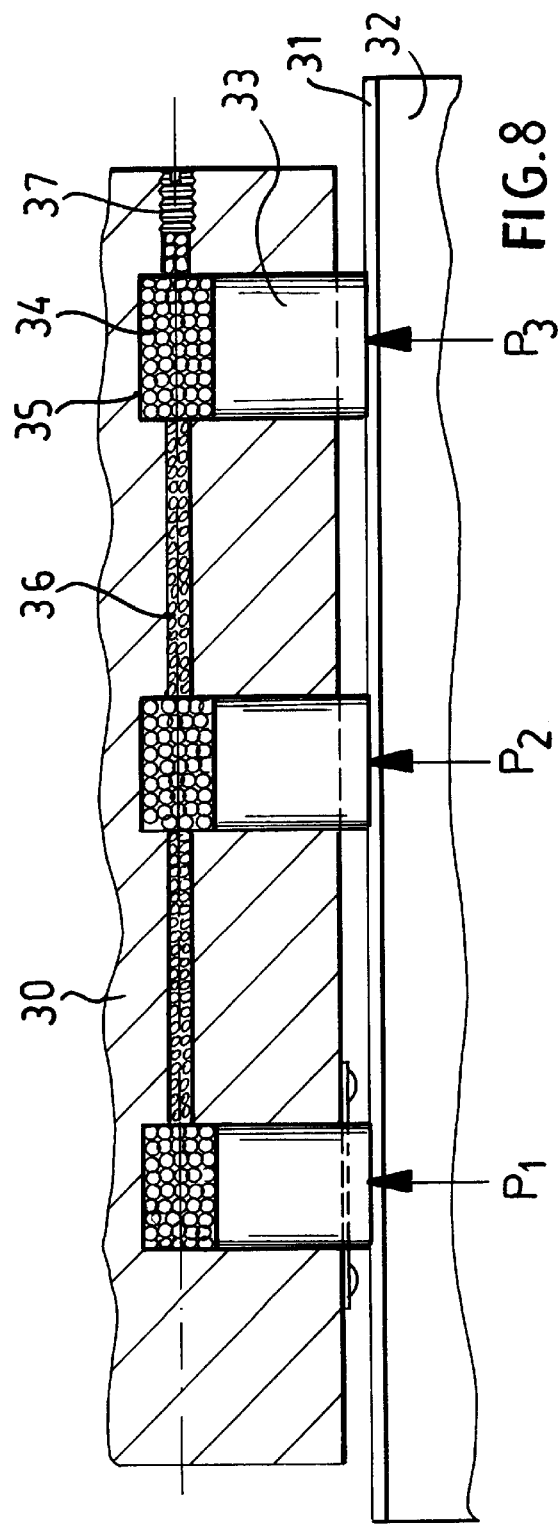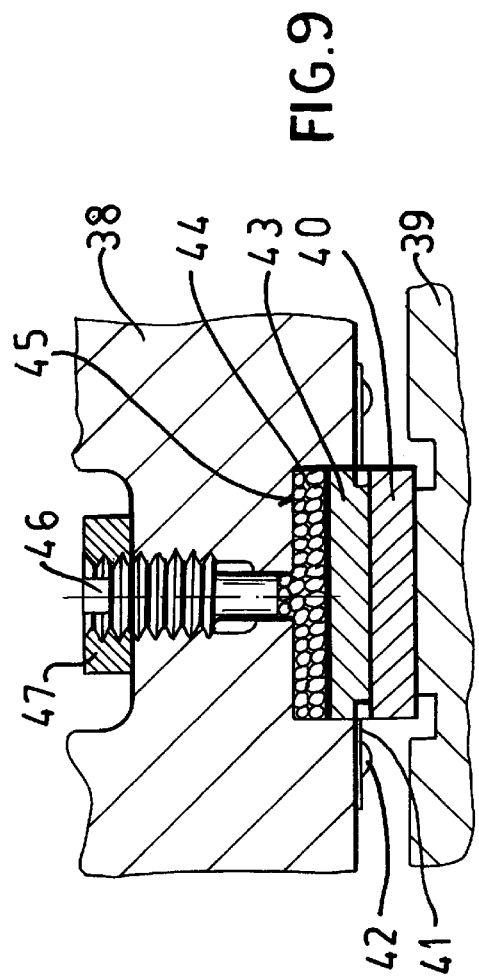

PRESSURE AND ALIGNMENT
COMPENSATOR FOR A PRESS

FIELD OF THE INVENTION

The present invention relates to a press. More particularly this invention concerns a pressure and alignment compensator for a press.

BACKGROUND OF THE INVENTION

A standard press, used for instance to hold together two mold halves during an injection-molding operation, has a relatively massive frame, typically of C-shape. One of the mold halves is mounted on one arm of the frame and an actuator braced against the other arm of the frame can press the other mold half toward and away from the one mold half. As such machines can be used to exert enormous pressures (see "Druckgießmaschine mit 2200t Schließdruck" by E. Brunhuber) it is not uncommon for the frame and mold halves or pressure plates carrying these halves to deform during a pressing operation.

As a result of this deformation the mold halves can deform and/or get canted or tipped. The result can be leakage out one side of the mold, excessive formation of flashing between the mold parts, or even damage to the machinery.

It has therefore been suggested in German patent documents 2,028,009 of Mnilk and 4,317,476 of Krell to provide a liquid-filled closed chamber between one of the mold parts and its support element. While such a system has some effectiveness in making pressure uniform over the surface of the mold, it cannot readily adapt to relatively tipped mold halves. In addition leakage is a problem under the extreme pressures used and such an arrangement must be cooled or insulated if it is to be used in a typical heated molding apparatus where temperatures are encountered that could vaporize the liquid.

OBJECTS OF THE INVENTION

It is therefore an object of the present invention to provide an improved pressure- and angle-compensator for a press.

Another object is the provision of such an improved pressure- and angle-compensator for a press which overcomes the above-given disadvantages, that is which is of simple construction and that efficiently compensates for angular misalignment of two mold halves or other elements being pressed together.

SUMMARY OF THE INVENTION

The instant invention is a compensator used with a machine frame having a pair of ends, a first mold half secured to one of the frame ends, a second mold half movable along an axis toward and away from the first mold half, and an actuator braced against the other frame end and having an outer end operatively engageable with the second mold half for pressing the second mold half axially against the first mold half. The compensator has according to the invention an element secured on the second mold half and another element secured on the actuator outer end together forming a substantially closed chamber. The two elements are displaceable axially and tippable relative to each other. A multiplicity of relatively displaceable and substantially incompressible metal balls fills the chamber.

If the pressure is so great that the frame deforms, the balls according to the invention will shift and maintain the two mold halves in perfect alignment while continuing to transmit considerable force to them to hold them together. Leakage of the balls is easy to prevent, the balls can transmit enormous force whether arrayed in a single layer or multiple layers, and they are relatively insensitive to high temperatures.

According to further features of the invention the frame is generally C-shaped and is at least limitedly deformable. A mass of dry graphite in the chamber fills interstices between the balls and provides a lubricant so that they slide readily on one another. In addition a pair of hardened steel plates is provided on each of the elements between same and the balls.

Means is provided in accordance with a further feature of the invention for pressing the balls tightly against each other and against the elements. This can be done by a hydraulically actuated piston or by a screw threaded into one of the elements and bearing on the balls.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 8 is a longitudinal section through a slide shoe of an injection-molding machine; and FIG. 9 is a section taken through another system according to the invention.

SPECIFIC DESCRIPTION

Figure 1:
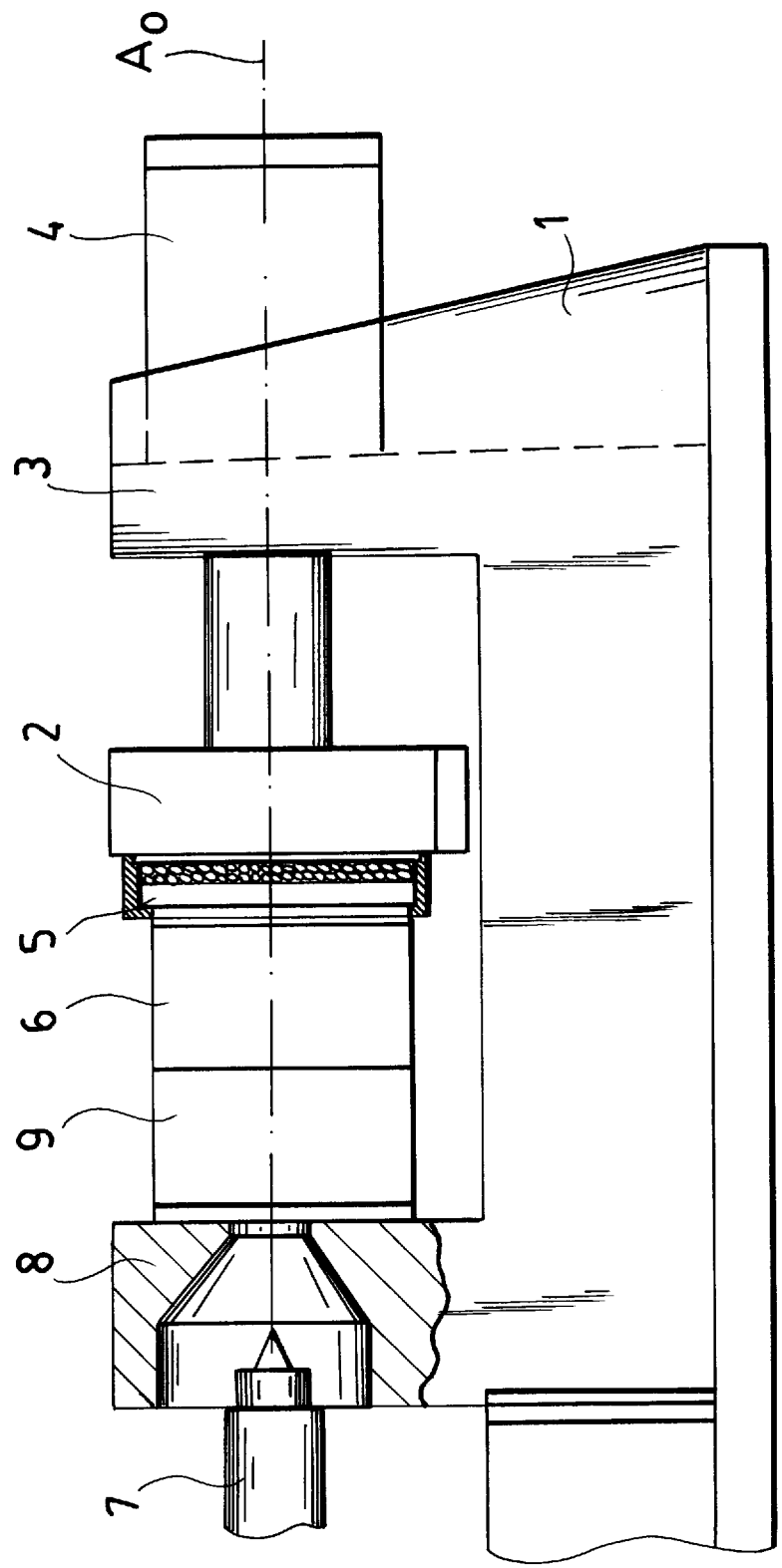
FIG. 1 is a side view partly in axial section through a press according to the invention.
Figure 2:
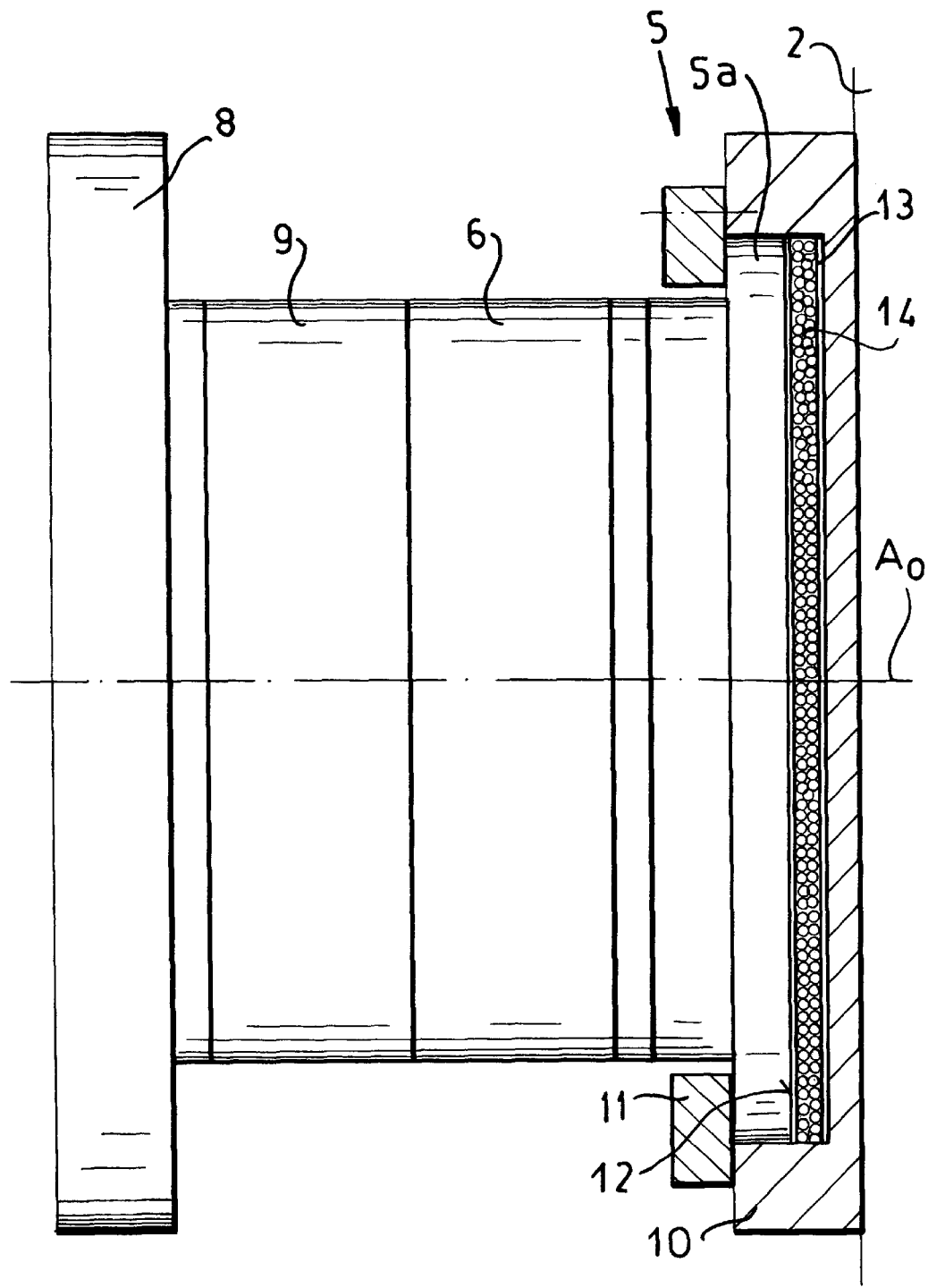
FIG. 2 is a large-scale view of a detail of FIG. 1.
Figure 3:
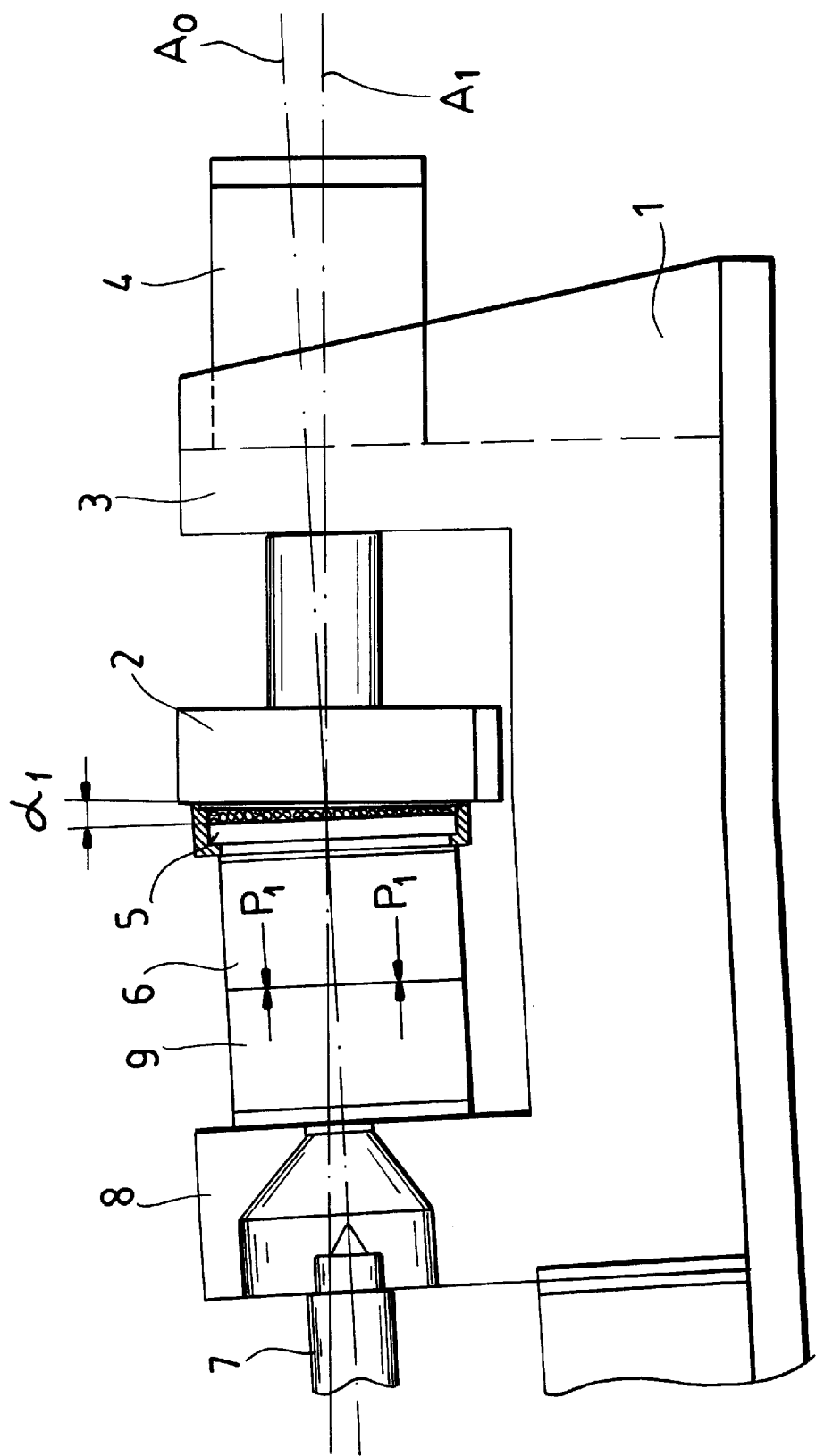
FIG. 3 is a view like FIG. 1 but showing the press plates canted relative to each other.
Figure 4:
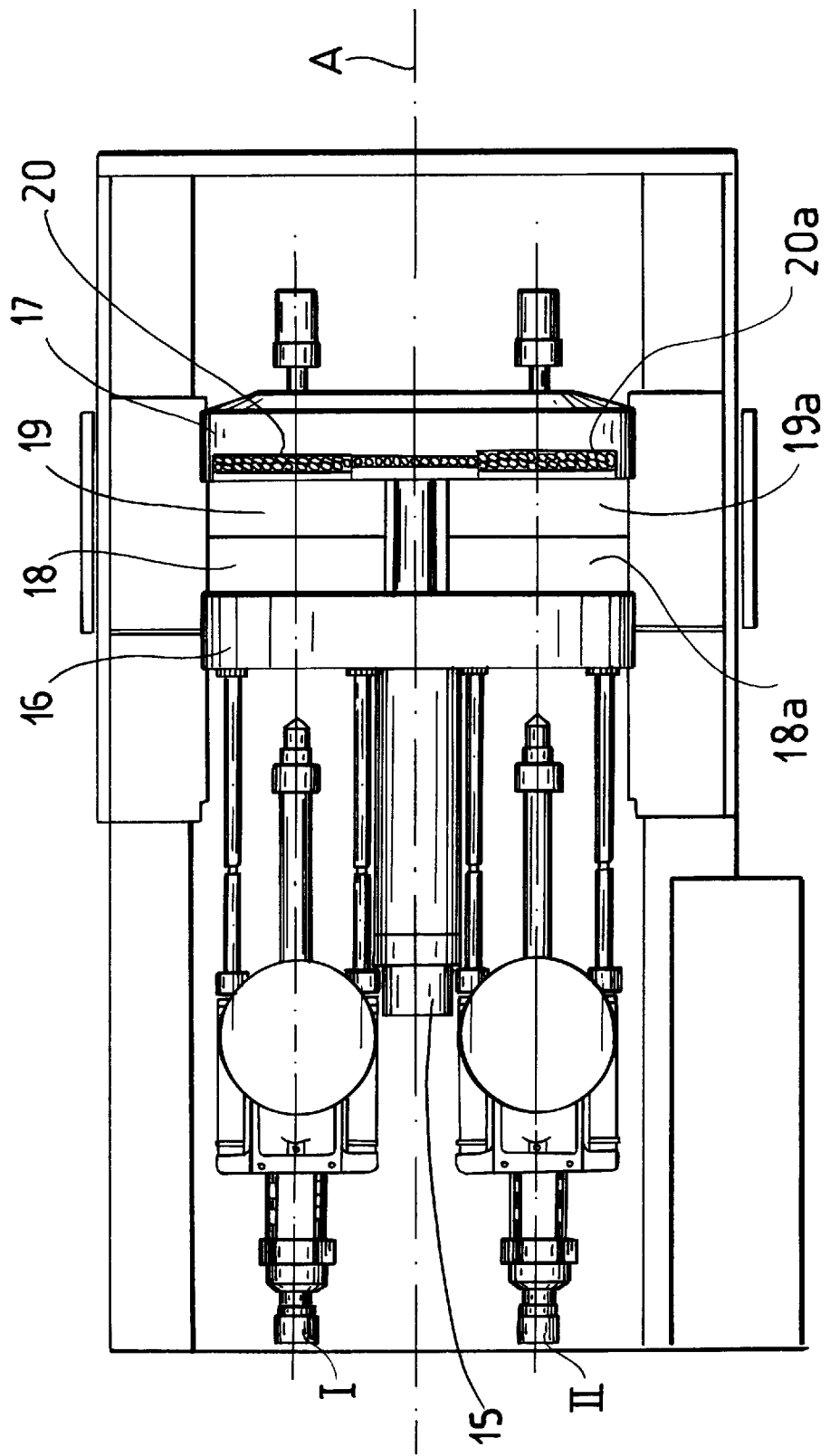
FIG. 4 is a top view partly in section through a two-part press in accordance with this invention.
Figure 5:
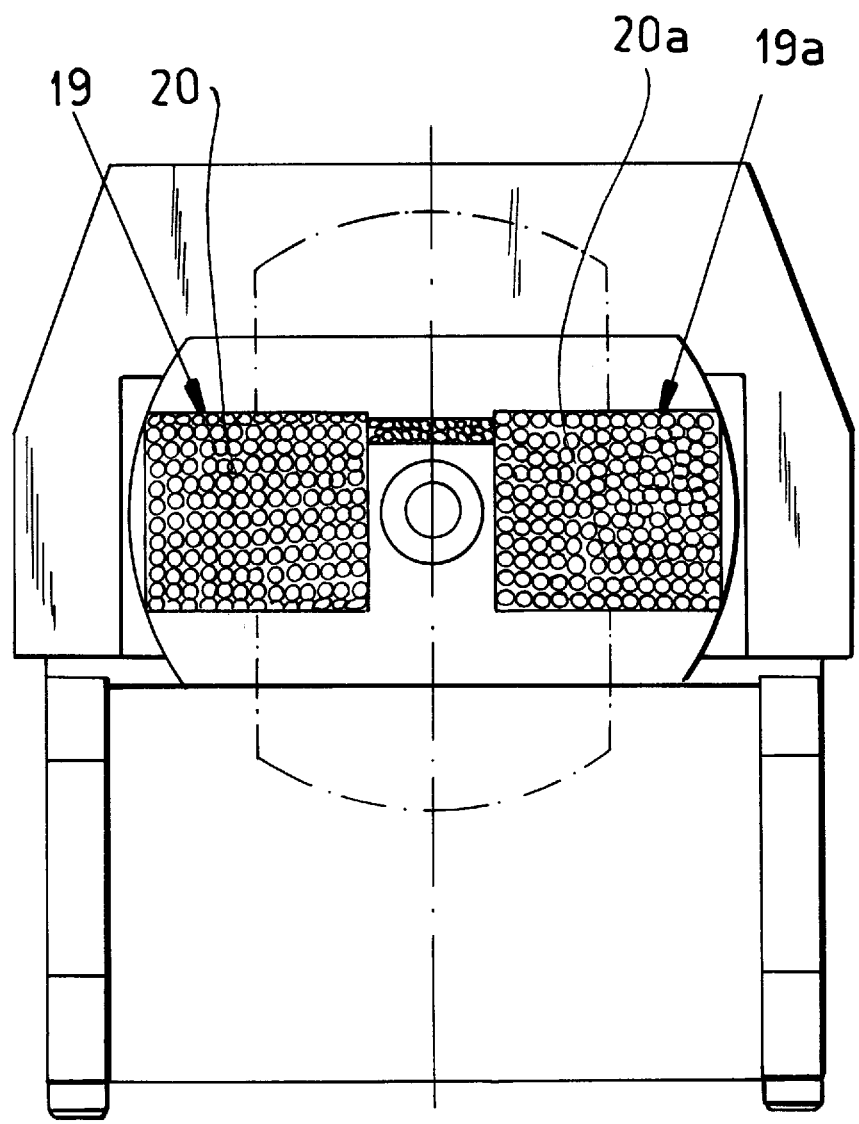
FIG. 5 is a section taken along line V—V of FIG. 4.

As seen in FIGS. 1 through 3 a massive C-shaped press frame 1 has one arm 3 carrying a hydraulic ram 4 connected to a movable press plate 2. Another arm 8 of the frame 1 is coupled to an injection-molding machine or extruder 7 and carries a fixed mold part 9 centered on an axis $A_o$. The movable press plate 2 carries a movable mold part 6 by means of a pressure- and angle-compensating device 5 shown in more detail in FIG. 2. The movable mold part 6 is centered on an axis $A_1$ that is normally coaxial with the axis $A_o$ and the ram 4 presses the two mold parts 6 and 9 together with an axial pressure $P_1$.

As better shown in FIG. 2 the compensator 5 comprises a cylinder member 10 mounted on the movable mold plate 2 and a piston member 5a fixed to the movable mold part 6 and slidable axially in the member 10 with a retaining ring 11 securing it in place. The two parts 5a and 10 have confronting faces lined with hardened-steel plates 12 and 13 and form a chamber filled with a tightly packed mass 14 of hardened steel balls and powdered graphite. The member 5a remains centered on the axis $A_o$ and can tip or cant with the mold half 6 relative to the axis $A_1$ on which the member 10 is centered.

Thus as shown in FIGS. 2 and 3 when the ram 4 presses the two mold parts 6 and 9 together with the pressure $P_1$ so that the frame 1 deforms and the axes $A_o$ and $A_1$ fall out of alignment with each other, the part 5a tips in the part 10, forming an angle $\alpha_1$ therewith. Thus the two mold parts 6 and 9 remain in perfect flat engagement with each other in spite of the deformation of the frame 1 and the pressure $P_1$ is exerted over the entire confronting faces of the two parts 6 and 9.

The system of FIGS. 4 through 7 has a pair of substantially identical press units I and II with a common ram 15 operating a common fixed movable mold plate 16 carrying a pair of fixed mold halves 18 and 18a. A fixed mold plate 17 juxtaposed along a center axis A with the plate 16 carries a pair of movable mold halves 19 and 19a via respective angle and pressure compensators 20 and 20a.

Figure 6:
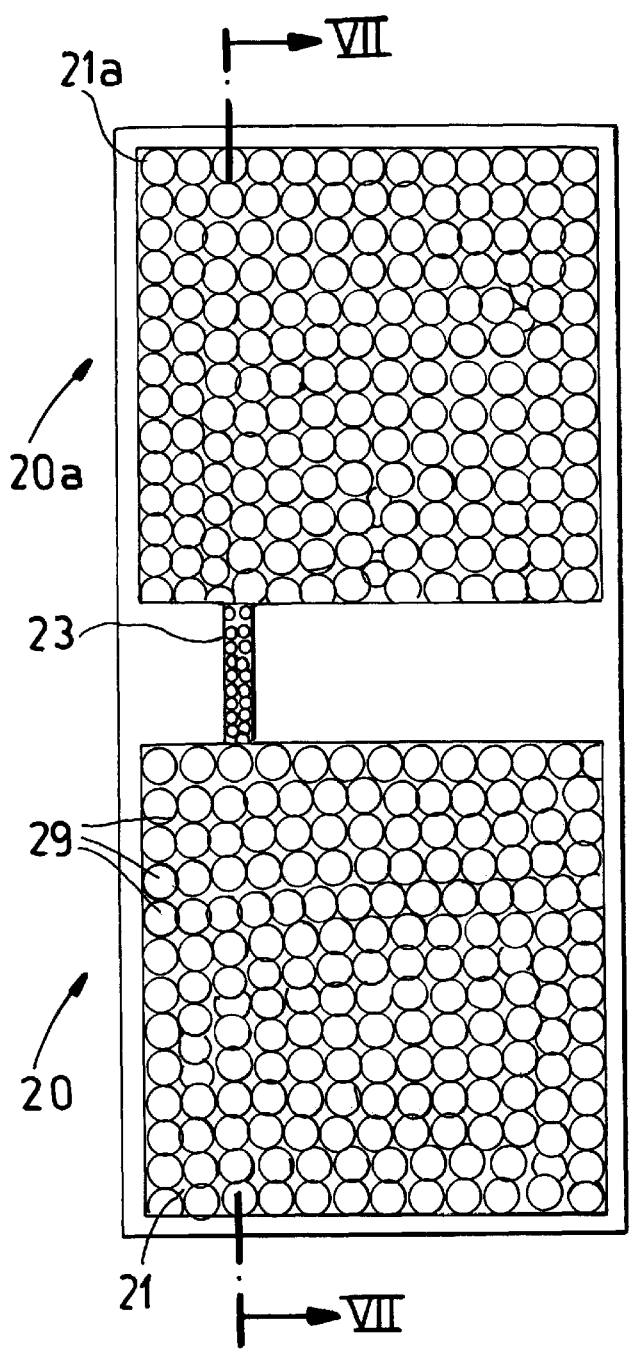
FIG. 6 is a large-scale view of a detail of FIG. 5.
Figure 7:
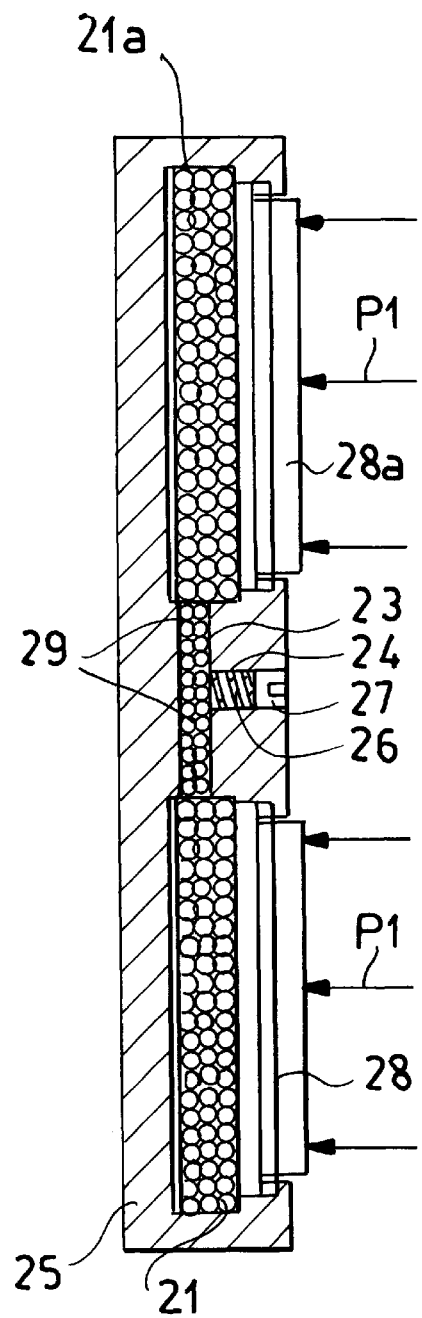
FIG. 7 is a section taken along line VII—VII of FIG. 6.

As better seen in FIGS. 6 and 7 the compensators 20 and 20a are comprised of respective chambers 21 and 21a filled by balls 29, interconnected by a passage 23, and closed by respective pusher plates 28 and 28a. A passage or port 24 opening into the passage 23 is provided with a spring 26 whose compression is set by a screw 27 to determine the prestressing of the balls 29 relative to each other. This system ensures that the pressure $P_1$ will be the same on both plates 28a even if the entire system is tipped as described above with reference to FIGS. 1 through 3.

In FIG. 8 the apparatus has a movable mold-holding plate 30 supported by slide bolts 33 on a rail 31 of a machine bed 32 of an injection-molding machine. The bolts 33 support the plate 30 by means of a multiplicity of steel balls 34 that are held in respective chambers 35 interconnected by a pressure-equalizing passage 36. A prestressing screw 37 closes the passage 36 and allows the prestressing of the balls 34 relative to one another. On tipping of the plate 30 the balls 34 adapt to the new position so that the pressures $P_1$, $P_2$, and $P_3$ are always the same.

The system of FIG. 9 has a mold-holding plate 38 supported on a machine bed 39 by means of a slide rail 40. A pressure- and angle-compensating plate 43 retained in place by a steel spring 41 and screw 42 is braced on one side against balls 44 in a chamber 45. The balls 44 can be prestressed against each other by a screw 46 held in place by a lock nut 47 although it is within the scope of this invention to replace this screw 46 with a hydraulically displaced small piston.

I claim:

1. In combination with
    a machine frame having a pair of ends;
    a first mold half secured to one of the frame ends;
    a second mold half movable along an axis toward and away from the first mold half; and
    means including an actuator braced against the other frame end and having an outer end operatively engageable with the second mold half for pressing the second mold half axially against the first mold half,
    a compensator comprising:
        an element secured on the second mold half and another element secured on the actuator outer end together forming a substantially closed chamber, the two elements being displaceable axially and tippable relative to each other;
        a multiplicity of relatively displaceable and substantially incompressible metal balls filling the chamber; and
        means for pressing the balls tightly against each other and against the elements.

2. The combination defined in claim 1 wherein the frame is generally C-shaped and is at least limitedly deformable.

3. In combination with
    a machine frame having a pair of ends;
    a first mold half secured to one of the frame ends;
    a second mold half movable alone an axis toward and away from the first mold half; and
    means including an actuator braced against the other frame end and having an outer end operatively engageable with the second mold half for pressing the second mold half axially against the first mold half,
    a compensator comprising:
        an element secured on the second mold half and another element secured on the actuator outer end together forming a substantially closed chamber, the two elements being displaceable axially and tippable relative to each other;
        a multiplicity of relatively displaceable and substantially incompressible metal balls filling the chamber; and
        a mass of dry graphite in the chamber filling interstices between the balls.

4. The combination defined in claim 1, further comprising a pair of hardened steel plates on each of the elements between same and the balls.

5. In combination with
    a machine frame having a pair of ends;
    a first mold half secured to one of the frame ends;
    a second mold half movable along an axis toward and away from the first mold half; and
    means including an actuator braced against the other frame end and having an outer end operatively engageable with the second mold half for pressing the second mold half axially against the first mold half,
    a compensator comprising:
        an element secured on the second mold half and another element secured on the actuator outer end together forming a substantially closed chamber, the two elements being displaceable axially and tippable relative to each other; and
        a multiplicity of relatively displaceable and substantially incompressible metal balls filling the chamber;
        means for pressing the balls tightly against each other and against the elements, the pressing means including a screw threaded into one of the elements and bearing on the balls.

* * * * *